US 8,746,490 B2

(12) United States Patent
Huffer et al.

(10) Patent No.: US 8,746,490 B2
(45) Date of Patent: Jun. 10, 2014

(54) RESEALABLE PACKAGE FILM

(71) Applicant: Sonoco Development, Inc., Hartsville, SC (US)

(72) Inventors: Scott William Huffer, Hartsville, SC (US); Donovan Young, Hartsville, SC (US)

(73) Assignee: Sonoco Development, Inc., Hartsville, SC (US)

( * ) Notice: Subject to any disclaimer, the term of this patent is extended or adjusted under 35 U.S.C. 154(b) by 0 days.

(21) Appl. No.: 13/670,135

(22) Filed: Nov. 6, 2012

(65) Prior Publication Data

US 2014/0124507 A1     May 8, 2014

(51) Int. Cl.
*B65D 77/20* (2006.01)
*B65B 7/28* (2006.01)

(52) U.S. Cl.
CPC .......... *B65D 77/2028* (2013.01); *B65B 7/2878* (2013.01); *B65D 77/2024* (2013.01)
USPC ......... 220/359.4; 220/359.3; 53/478; 53/477; 156/247

(58) Field of Classification Search
CPC .......... B65D 77/2024; B65D 77/2032; B65D 77/2028; B65D 77/2096; B65D 77/2068; B29C 65/18; B65B 7/2878; B65B 7/2842; B65B 7/28
USPC ........ 220/359.4, 359.3, 359.1, 270, 266, 265, 220/260; 156/247; 53/478, 477
See application file for complete search history.

(56) References Cited

U.S. PATENT DOCUMENTS

| | | | |
|---|---|---|---|
| 3,328,196 A * | 6/1967 | Sincock | 428/36.6 |
| 3,454,210 A | 7/1969 | Spiegel | |
| 3,464,832 A * | 9/1969 | Mullinix | 206/557 |
| RE27,361 E | 5/1972 | Miller | |
| 3,938,659 A | 2/1976 | Wardwell | |
| 3,946,872 A | 3/1976 | Sturm | |
| 3,997,677 A | 12/1976 | Hirsch et al. | |
| 4,206,844 A | 6/1980 | Thukamoto et al. | |
| 4,364,989 A | 12/1982 | Moyle | |
| 4,381,848 A | 5/1983 | Kahn | |
| 4,438,850 A | 3/1984 | Kahn | |
| 4,469,258 A | 9/1984 | Wright et al. | |
| 4,673,601 A | 6/1987 | Lamping et al. | |
| 4,786,534 A | 11/1988 | Aiken | |
| 4,858,780 A | 8/1989 | Odaka et al. | |

(Continued)

FOREIGN PATENT DOCUMENTS

| | | |
|---|---|---|
| EP | 0 661 154 A1 | 7/1995 |
| JP | 08175571 | 7/1996 |
| WO | 2009111153 A1 | 9/2009 |

OTHER PUBLICATIONS

International Search Report, PCT/US2013/068479, dated Mar. 14, 2014.

*Primary Examiner* — Robert J Hicks
(74) *Attorney, Agent, or Firm* — Flaster/Greenberg, P.C.

(57) ABSTRACT

A package film is provided for attaching to a base member to define a package. The package film construction includes a top layer having a top surface and a bottom surface. A removable adhesive is provided having a defined pattern applied below the bottom surface. A polyethylene (PE) emulsion layer is provide that covers at least a portion of the adhesive pattern, with the PE emulsion layer being heat sealable to the base member.

30 Claims, 5 Drawing Sheets

(56) References Cited

U.S. PATENT DOCUMENTS

| | | | |
|---|---|---|---|
| 4,915,289 A | 4/1990 | Hatano et al. | |
| 4,944,409 A | 7/1990 | Busche et al. | |
| 5,061,532 A | 10/1991 | Yamada | |
| 5,125,529 A | 6/1992 | Torterofot | |
| 5,145,737 A | 9/1992 | Boiron et al. | |
| 5,160,767 A | 11/1992 | Genske et al. | |
| 5,281,453 A | 1/1994 | Yamada et al. | |
| 5,382,472 A * | 1/1995 | Yanidis et al. | 428/349 |
| 5,518,790 A | 5/1996 | Huber et al. | |
| 5,709,310 A | 1/1998 | Kretz | |
| 5,759,650 A | 6/1998 | Raines et al. | |
| 5,873,483 A * | 2/1999 | Gortz et al. | 220/269 |
| 5,882,749 A | 3/1999 | Jones et al. | |
| 5,882,789 A | 3/1999 | Jones et al. | |
| 5,915,547 A * | 6/1999 | Chen | 206/296 |
| 6,032,800 A | 3/2000 | Kocher | |
| 6,042,862 A * | 3/2000 | Kocher et al. | 426/411 |
| 6,056,141 A * | 5/2000 | Navarini et al. | 220/269 |
| 6,127,023 A | 10/2000 | Marbler et al. | |
| 6,165,115 A | 12/2000 | Rea | |
| 6,248,380 B1 | 6/2001 | Kocher et al. | |
| 6,302,290 B1 | 10/2001 | Engelaere | |
| 6,302,324 B1 | 10/2001 | Buchko | |
| 6,308,853 B1 | 10/2001 | Jud | |
| 6,436,499 B1 | 8/2002 | Krampe et al. | |
| 6,511,723 B1 | 1/2003 | Engelaere | |
| 6,627,273 B2 | 9/2003 | Wolf et al. | |
| 6,670,023 B2 * | 12/2003 | Mueller | 428/189 |
| 6,722,272 B2 | 4/2004 | Jud | |
| 6,770,050 B2 * | 8/2004 | Epstein | 604/35 |
| 6,786,994 B2 * | 9/2004 | Williams et al. | 156/240 |
| 6,790,508 B2 | 9/2004 | Razeti | |
| 6,960,392 B2 | 11/2005 | Le Du et al. | |
| 7,422,782 B2 | 9/2008 | Haedt et al. | |
| 7,874,731 B2 | 1/2011 | Turvey et al. | |
| 7,927,679 B2 | 4/2011 | Cruz et al. | |
| 8,091,323 B2 | 1/2012 | Paterson | |
| 8,114,451 B2 | 2/2012 | Sierra-Gomez et al. | |
| 8,173,233 B2 | 5/2012 | Rogers et al. | |
| 2001/0001282 A1 | 5/2001 | Parmentier et al. | |
| 2002/0034649 A1 | 3/2002 | Le Du et al. | |
| 2002/0197425 A1 | 12/2002 | Wolf et al. | |
| 2003/0175509 A1 | 9/2003 | Franko, Sr. | |
| 2004/0016208 A1 | 1/2004 | Mumpower et al. | |
| 2004/0151932 A1 | 8/2004 | Galloway | |
| 2005/0276525 A1 | 12/2005 | Hebert et al. | |
| 2006/0172131 A1 | 8/2006 | Haedt et al. | |
| 2006/0233987 A1 | 10/2006 | Mumpower | |
| 2007/0237913 A1 | 10/2007 | Hagino | |
| 2008/0063821 A1 | 3/2008 | Galloway | |
| 2008/0152850 A1 | 6/2008 | Paterson | |
| 2009/0311454 A1 | 12/2009 | Stephens | |
| 2010/0172604 A1 | 7/2010 | Andersson et al. | |
| 2010/0247003 A1 | 9/2010 | Huffer et al. | |
| 2010/0323134 A1 | 12/2010 | Bostian et al. | |
| 2012/0067896 A1 * | 3/2012 | Daffner et al. | 220/359.3 |

* cited by examiner

RESEALABLE PACKAGE FILM

FIELD OF THE INVENTION

The present application relates to a film for a package that is separable from the package base portion and then may be resealed. In one specific embodiment, the package is a container having a film lidding attached to a flange on the container.

BACKGROUND OF THE INVENTION

A number of packaging forms are known. In one form, a thermoform tray is provided for retaining a product, with a flexible film forming a seal for the tray. The tray may include a peripheral flange and the film is attached to the flange. The attachment of the film to the flange may be accomplished by a variety of means, such as heat sealing, adhesives, etc. The film may be separable from the flange to gain access to the contents and the film or a portion thereof may be resealed by means of an adhesive.

It is known to use a hot-melt pressure sensitive adhesive (PSA) that is extruded between film layers of polyethylene terephthalate (PET) and polyethylene (PE) to create a resealable lidding layer. This structure requires adhesive applied as a 100% coverage coating (i.e., not pattern applied between the PET and PE layers).

U.S. Pat. No. 4,206,844 to Thukanato et al. shows a package with a cover sheet that is peelable for the package base and the resealable. The package body is formed of a laminate having a paper substrate, a polyester emulsion layer and a thermoplastic resin emulsion layer on the polyester emulsion layer. A heat seal is formed between the cover sheet and the thermoplastic resin emulsion layer to seal the package. When the cover sheet is peeled back, a portion of the thermoplastic resin layer is broken at the heat seal.

U.S. Pat. No. 4,364,989 to Moyle shows a package material for use in retaining snack foods. The package material is composed of multiple layers with an outer layer of polypropylene (PP), a low-density polyethylene (PE) laminate and an inner layer of a co-extrusion material. Emulsion layers of polyvinyl chloride (PVC) are provided between the packaging layers and are used to create a heat sealant in the formation of the package.

U.S. Pat. No. 3,454,210 to Spiegel et al. shows a multilayer package having a central, rupturable, preformed-film layer of polyethylene (PE). The rupturable film is formed adjacent a layer of pressure sensitive adhesive (PSA). A heat seal is formed to secure the rupturable film to the base layer in the sealed package.

U.S. Pat. No. 5,518,790 to Huber et al shows a multilayer package for sealing an aromatic substance. A central layer formed from a foamed polypropylene is provided between a barrier layer in a top laminate and the base layers in the package. The top layer is secured to the foamed polypropylene (PP) by an adhesive. The separation of the top layer is indicated to result from the difference in density of the top layer and the foamed PP.

SUMMARY OF THE INVENTION

In one aspect of the present disclosure, a film is provided for attaching to a base member to define a package. The package film construction includes a top layer having a top surface and a bottom surface. A removable adhesive is provided having a defined pattern applied below the bottom surface. A polyethylene (PE) emulsion layer is provide that covers at least a portion of the adhesive pattern, with the PE emulsion layer being heat sealable to the base member.

In a further aspect of the construction, an ink layer may be provided. The ink layer may further be applied to the bottom surface of the top layer, or as otherwise desired. A bottom layer may be provided below the bottom surface, with the bottom layer secured to the ink layer and the adhesive pattern applied below the bottom layer. The bottom layer may further be secured to the top layer and/or the ink layer by means of a permanent adhesive.

In a further aspect of the package film, the PE emulsion layer is pattern applied to cover the adhesive pattern. Alternatively, the PE emulsion layer may be continuously applied below the bottom surface of the top layer and over the adhesive pattern.

In a further aspect of the disclosure, the top layer may be a polyethylene terephthalate (PET) material.

In a further aspect of the disclosure, the adhesive pattern conforms to at least a portion of the periphery of the base member of the package. Further, the PE emulsion may be applied over the entire pattern of the removable adhesive. Alternatively, the PE emulsion may conform to a portion of the adhesive pattern. The adhesive is contemplated to form a more permanent bond in the areas where the PE emulsion is absent.

In a further aspect of the disclosure, a resealable package is defined including a package film having a top layer, the top layer having a top surface and a bottom surface. A removable adhesive is applied in a pattern below the bottom surface and a polyethylene (PE) emulsion layer is provided for covering at least a portion of the adhesive pattern. A package base is provided having a peripheral portion. The pattern of the removable adhesive on the film preferably conforms to the peripheral portion of the base. A skin portion is further provided on the peripheral portion, with the skin portion being heat-sealable to the PE emulsion layer. The PE emulsion layer is heat-sealed to the skin portion and emulsion transforms to a material having film-like properties during heating. The removable adhesive is separable from the transformed PE film-like material for separating the top layer from the base, with the removable adhesive being resealable to the transformed PE film for closing the package.

In a further aspect of the disclosure, a method of forming a resealable package is defined. A package film is provided having a top layer, the top layer having a top surface and a bottom surface. A removable adhesive is provided in a defined pattern below the bottom surface of the package film. A polyethylene (PE) emulsion layer is applied in a pattern covering at least a portion of the removable adhesive pattern. A base is provided having a peripheral portion, with the package film positioned in contact with the base. The pattern of the removable adhesive conforms to the peripheral portion of the base and wherein the PE emulsion is in contact with the peripheral portion of the base. The package film is heat-sealed to the peripheral portion of the base, with the applied heat transforming the PE emulsion to a film-like material. The PE emulsion film-like material is attached to the base with the top layer being separable along with the removable adhesive to open the package. The top layer is resealable to the peripheral portion of the base by means of the removable adhesive.

Other features of the present invention will become apparent from the detailed description to follow, taken in conjunction with the accompanying drawings.

BRIEF DESCRIPTION OF THE DRAWINGS

For the purpose of illustrating the invention, the drawings show one or more forms that are presently preferred. It should be understood that the invention is not limited to the precise arrangements and instrumentalities shown.

DETAILED DESCRIPTION

Figure 1:
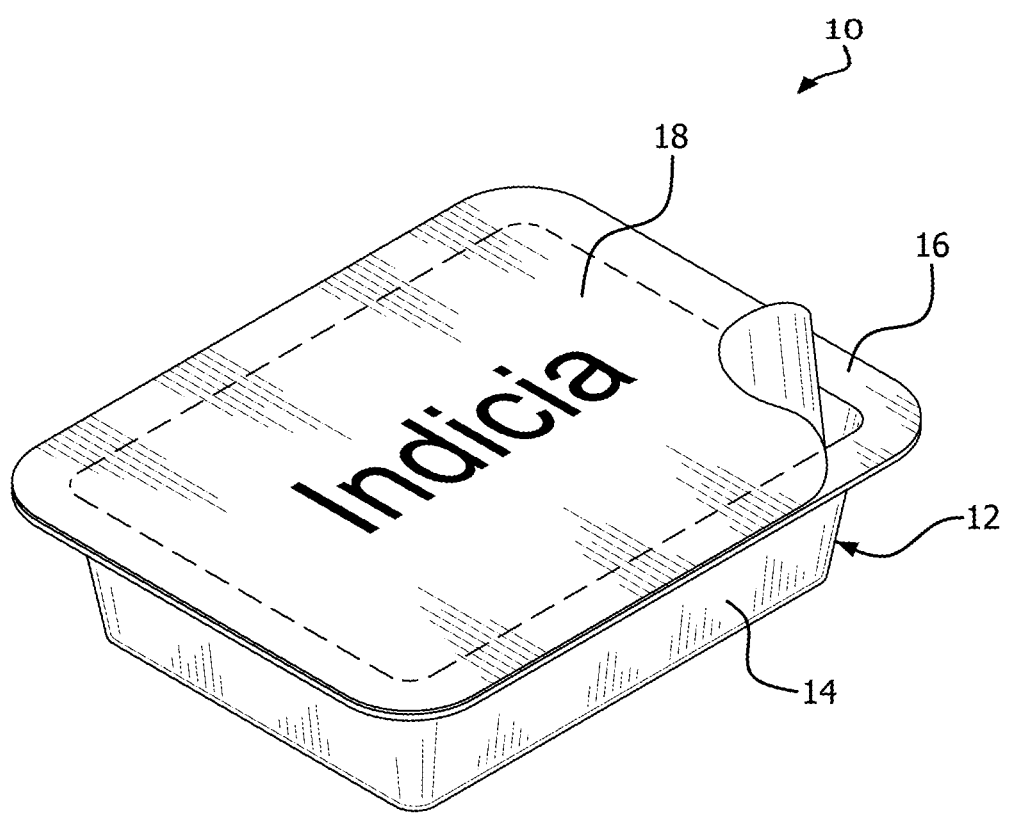
FIG. 1 shows a package in a form incorporating various features of the present disclosure.

In the figures, where like numerals identify like elements, there is shown an embodiment of a package that in FIG. 1 is generally designated by the numeral 10. The package 10 includes a base member 12 in the form of a tray having a main body portion 14 and a peripheral flange 16. As shown, the body portion 14 includes a plurality of sidewalls extending from a bottom wall (not visible) to define a retaining cavity having sufficient volume for storing a desired product (not shown). The flange 16 extends outwardly from the sidewalls of the body 14, although other configurations are possible. A flexible film 18 covers the tray 12 and is attached to the flange 16. FIG. 1 shows a corner of the film 18 partially removed from the flange 16, as part of the process for providing access to product within the tray 12.

Figure 2A:
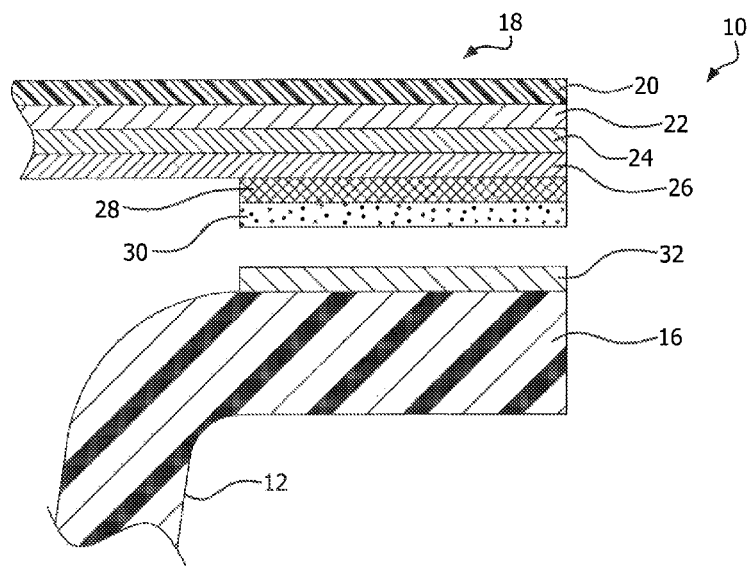
FIG. 2A is a first cross sectional view of an embodiment of a package, showing a flange portion of a package tray and a composite film material, prior to securing the film to the flange.

A partial cross section of the constituent parts of the film 18 and tray 12 of the package 10 is shown in FIG. 2A. This drawing shows the tray 12 prior to attachment of the package film 18 to the flange 16 and thereby prior to the sealing of product within package 10. The tray may be made of any number of materials. For example, the tray may be formed from polypropylene (PP) or high-density polyethylene (HDPE). The tray 12 is contemplated to be relatively rigid in form and may include structural elements that add to the stiffness of the form. The tray 12 may be made by any number of methods, including a thermoforming process.

The package film 18 includes a number of layers, but may be composed of a single base layer or a number of laminated layers. As shown, a polyethylene terephthalate (PET) top layer 20 is provided on its bottom surface with a layer of ink 22. The ink layer 22 is contemplated to form a decorative pattern on the package 10 (shown as "Indicia" in FIG. 1). The ink layer 22 may be continuous across the bottom surface of the top layer 20 or may cover only a portion of the surface area. An adhesive layer 24 is provided below the ink layer 22, with the adhesive 24 securing a bottom layer 26, preferably a PET material. A patterned adhesive 28 is provided below the bottom layer 26. The patterned adhesive 28 is preferably a pressure sensitive adhesive (PSA), but may have other forms.

A coating 30 is applied over the patterned adhesive 28. The coating 30 is a thin layer of a polyethylene (PE) emulsion (such as, MED688 from Michelman, Inc. of Cincinnati, Ohio) and is applied in a pattern that overlaps the adhesive 28. The PE emulsion 30 is typically applied wet and is dried in a relatively low temperature oven (for example, at 170° F.) or by other means. The PE emulsion 30 covers the adhesive 28, such that the package film 18 may be rolled or stacked prior to application to the tray 12 or otherwise utilized.

Figure 2B:
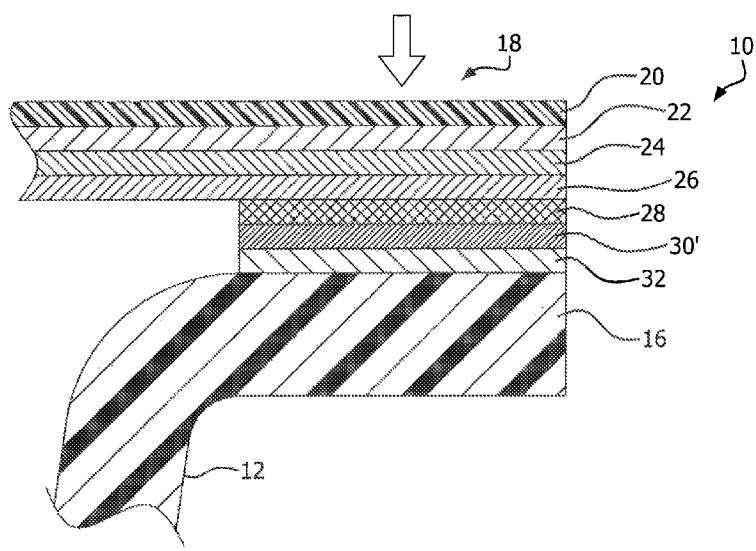
FIG. 2B is a second cross sectional view of the embodiment of the package shown in FIG. 2A, showing the flange portion and the film after securing the film to the flange.

The package film 18 is cut to size and aligned with the tray flange 16. The flange 16 preferably includes a skin layer 32, which is preferably also a PE material. The film 18 is heat-sealed to the flange 16 and forms the structure shown in FIG. 2B. The temperature and time of application of heat and the size of the heat-sealing element may vary depending on the desired strength of the seal and on the various materials and material thicknesses in the overall structure.

The PE emulsion 30, as shown in FIG. 2A, is exposed to heat during the heat-sealing process and undergoes a physical transformation. This transformation is illustrated graphically in FIG. 2B and is identified as layer 30'. The dispersion particles within the emulsion (that are typically coalesced and that create a cloudy appearance in the dried emulsion) fuse together upon heating. The transformation caused by the heat-sealing operation results in the emulsion becoming a clear, film-like material and dramatically increases the tensile and elongation strength of the PE material (as compared to the emulsion form). The resulting PE film material 30' bonds to the skin layer 32 applied to the tray flange 16.

Figure 2C:
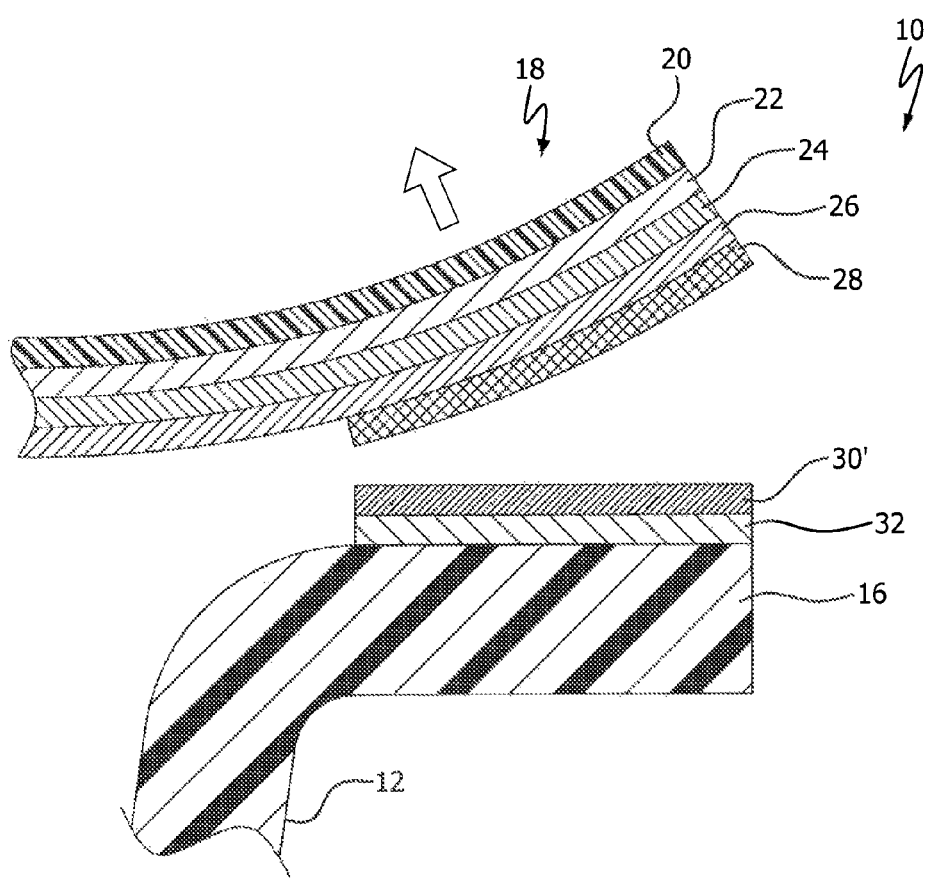
FIG. 2C is a third cross sectional view of the embodiment of the package in FIGS. 2A and 2B, showing the flange portion and the film after separation of the film from the flange.

The PE film layer 30' is adhered to the skin layer 32 to seal the tray 12. The package film 18 may be separated from the flange 16, as is graphically illustrated in FIG. 1. As shown in FIG. 2C, the separation of the lidding 18 from the tray flange 16 is created between the PE film layer 30', which is sealed to the skin layer 32 on the flange 16, and the PSA adhesive 28. Hence, the PSA adhesive 28 is exposed at the time of separation. The exposed adhesive 28 on the underside permits the package film 18 to be re-attached to the tray 12 (preferably repeatedly). A number of types of adhesive may be used in the film construction. A PSA is only one example. As an alternate example, a layer or pattern of a primer/varnish material may be applied between the PE emulsion layer 30 and the adhesive pattern 28 to control the separation of the adhesive or to control the adhesive force.

Figure 3A:
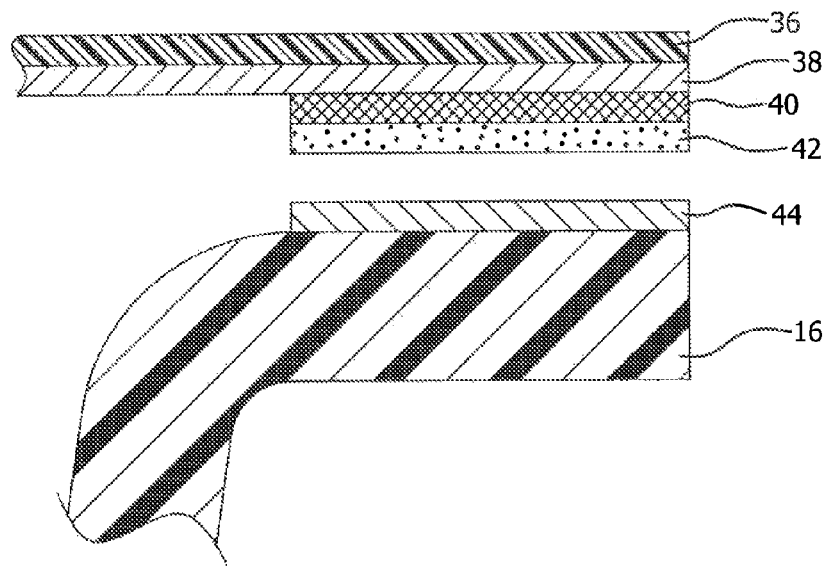
FIG. 3A is a first cross sectional view of a further embodiment of a package, showing a flange portion of a package tray and a composite film material prior to securing the film to the flange.
Figure 3B:
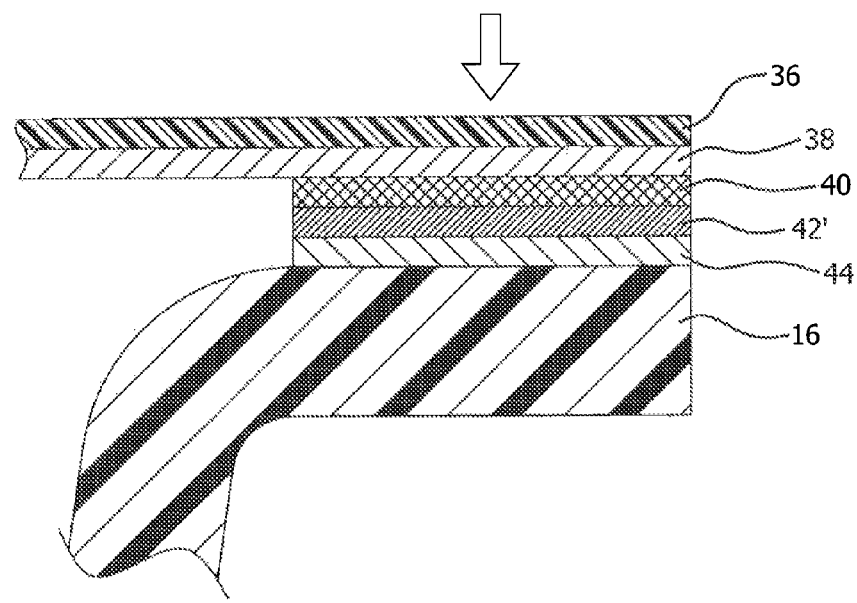
FIG. 3B is a second cross sectional view of the embodiment of the package shown in FIG. 3A, showing the flange portion and the film after securing the film to the flange.
Figure 3C:
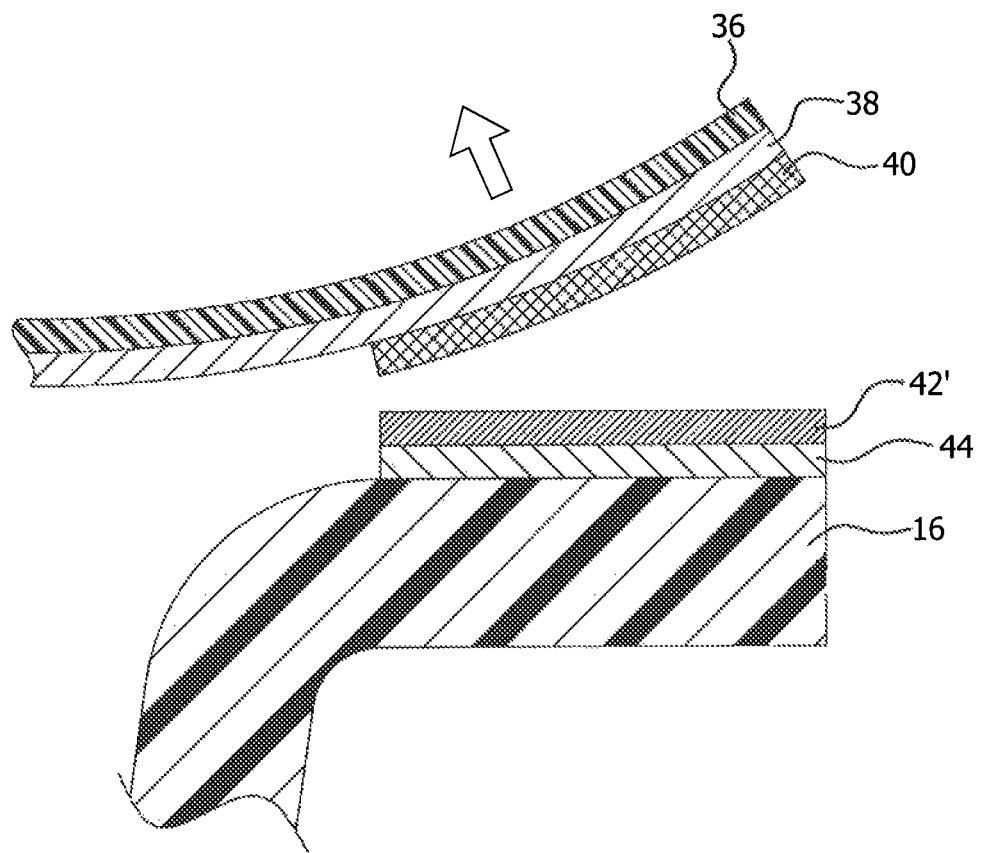
FIG. 3C is a third cross sectional view of the embodiment of the package in FIGS. 3A and 3B, showing the flange portion and the film after separation of the film from the flange.

In FIGS. 3A, 3B and 3C, there is shown a further embodiment of a package film. A barrier and/or top layer 36 of PET is applied with an ink layer 38 on its bottom surface. In either embodiment shown or as otherwise contemplated, the print may be applied on the top surface of the film, leaving the underside free of ink. Alternatively, separate ink patterns may be applied to both surfaces (or applied to other layers in the film construction). A pattern adhesive 40, with the pattern preferably conforming generally to at least a portion of the periphery defined by the flange 16. A PE emulsion 42 is pattern applied over the adhesive 40. A PE skin layer 44 is adhered to the flange 16 of the tray 12. Again, the PE emulsion layer 42' (FIG. 3A) transforms upon application of heat and attains film-like properties. The PE film 42' adheres to the skin layer 44 (FIG. 3B). Upon separation of the top layer 36, the transformed PE film 42' adheres to the skin layer 44 on the flange 16 and exposes the adhesive 40 on the bottom surface of the top layer 36 (FIG. 3C).

The top layers (20, 36) or bottom layer (26) in the above examples may be provided with polyvinylidene chloride (PVDC), nanoclay (NANO), polyvinyl (PVOH), ethylene vinyl alcohol (EVOH) materials. Other barrier materials/layers may also serve to improve performance, including a PET film metalized with aluminum oxide (AlOx) vapor deposition or a film having a silicon oxide (SiOx) coating. Such materials/layers are contemplated to serve as a moisture and/or oxygen barrier. Another variation of the package film structure may include the application of a PE emulsion layer continuously across the bottom surface of top layer(s). This continuous emulsion layer would serve as a coating for any ink layer. Only a portion of the continuous PE emulsion layer fuses to the flange of the tray or other package surface during the heat-seal step. It is contemplated that the PE emulsion layer would be fragile enough to split at the end of the adhesive pattern, in the area where the heat-sealing did not occur. Hence, the pattern adhesive material would be exposed, with a portion of the PE layer adhered to the flange (etc.). The other portion of the PE emulsion remains adhered to the underside of the package film.

Other variations of the structures shown may include an adhesive pattern that conforms to only a portion of the periphery of the base of the package. Further, the PE emulsion may be applied over the entire pattern of the removable adhesive or, alternatively, the PE emulsion may conform to a portion of the adhesive pattern. The adhesive is contemplated to form a more permanent bond in the areas where the PE emulsion is absent. The portion of the resealable adhesive within the pattern that is exposed after the heat-sealed PE material separates from the package film forms the means for repeatedly resealing the package.

In the presently contemplated structures, die cutting or laser scoring of the layers is not required to create the separation of the lidding from the flange of the tray. However, in some structures and variations, a score line or other separation pattern may be used to create a desired function within the package. It is further noted that the contemplated structures incorporating a PE emulsion material may be used within other types of packages. For example, a similar separation and resealing function may be created with a flexible package material to form a pouch-like structure. The adhesive pattern and the PE emulsion coating are contemplated to conform to at least a portion of the sealing periphery of the base package portion.

The present disclosure shows and describes a number of exemplary embodiments. It should be understood by those skilled in the art from the foregoing that various other changes, omissions and additions may be made therein, without departing from the spirit and scope of the contemplated invention, with the scope of the invention being defined by the foregoing claims.

What is claimed is:

1. A film construction for attaching to a base member to define a package, the film construction comprising:
    a top layer, the top layer having a top surface and a bottom surface,
    a removable adhesive having a defined pattern applied below the bottom surface, and
    a polyethylene (PE) emulsion layer, covering at least a portion of the adhesive pattern, wherein the PE emulsion layer is heat sealable.

2. A film construction as in claim 1, further comprising an ink layer.

3. A film construction as in claim 2, wherein the ink layer is applied to the bottom surface of the top layer.

4. A film construction as in claim 3, further comprising a bottom layer, the bottom layer secured to the ink layer, below the bottom surface of the top layer, and the adhesive pattern applied to a bottom surface of the bottom layer.

5. A film construction as in claim 4, wherein the bottom layer is secured by means of a permanent adhesive.

6. A film construction as in claim 1, wherein the PE emulsion layer is pattern applied to cover the adhesive pattern.

7. A film construction as in claim 1, wherein the PE emulsion layer is continuously applied below the bottom surface of the top layer and over the adhesive pattern.

8. A film construction as in claim 1, wherein the top layer is a polyethylene terephthalate (PET) material.

9. A film construction as in claim 1, wherein the PE emulsion layer is applied over the entire pattern of the removable adhesive.

10. A film construction as in claim 1, wherein the adhesive pattern conforms to a periphery of the top layer.

11. A resealable package comprising:
    a package film having
        a top layer, the top layer having a top surface and a bottom surface,
        a removable adhesive applied in a pattern below the bottom surface, and
        a polyethylene (PE) emulsion layer, covering at least a portion of the adhesive pattern, and
    a base, the base having
        a peripheral portion, the pattern of the removable adhesive on the film conforming to the peripheral portion of the base, and
        a skin portion on the peripheral portion, the skin portion being heat-sealable to the PE emulsion layer,
    wherein the PE emulsion layer is heat-sealed to the skin portion and the PE emulsion transforms to a film during heat-sealing, and
    wherein the removable adhesive is separable from the transformed PE film for separating the top layer from the base, and the removable adhesive being resealable to the transformed PE film for closing the package.

12. A resealable package as in claim 11, wherein the base is formed as a tray having one or more upstanding side walls defining a package form, and wherein the peripheral portion is a flange that surrounds the package form.

13. A resealable package as in claim 12, wherein the tray is formed from a substantially rigid material.

14. A resealable package as in claim 13, wherein the skin portion is a PE layer adhered to the flange.

15. A resealable package as in claim 11, wherein the package film further comprises an ink layer.

16. A resealable package as in claim 15, wherein the ink layer is applied to the bottom surface of the top layer.

17. A resealable package as in claim 16, wherein the package film further comprises a bottom layer, the bottom layer secured to the ink layer and the bottom surface of the top layer, the adhesive pattern applied to a bottom surface of the bottom layer.

18. A resealable package as in claim 17, wherein the bottom layer is secured by means of a permanent adhesive.

19. A resealable package as in claim 11, wherein the PE emulsion layer is continuously applied across the bottom surface area of the top layer and the adhesive pattern.

20. A resealable package as in claim 11, wherein the PE emulsion layer is applied over the entire pattern of the removable adhesive.

21. A method of forming a resealable package, comprising the steps of:
    providing a package film having a top layer, the top layer having a top surface and a bottom surface,
    applying a removable adhesive in a defined pattern below the bottom surface of the package film,
    applying a polyethylene (PE) emulsion layer in a pattern covering at least a portion of the removable adhesive pattern, providing a base, the base having a peripheral portion, placing the package film in contact with the base, wherein the pattern of the removable adhesive conforms to the peripheral portion of the base and wherein the PE emulsion is in contact with the peripheral portion of the base, heat-sealing the package film to the peripheral portion of the base, with the applied heat transforming the PE emulsion to a film material, separating the PE emulsion film and the base from the top layer and the removable adhesive to open the package, and resealing the removable adhesive to the peripheral portion.

22. A method as in claim 21, further comprising the step of:

providing a skin portion on the peripheral portion of the base, the skin portion being heat-sealable to the PE emulsion layer.

23. A method as in claim 21, wherein the base is formed as a tray having one or more upstanding sidewalls and defines a package form, and wherein the peripheral portion is formed as a flange that surrounds the package form.

24. A method of forming a resealable package as in claim 23, wherein the tray is thermoformed.

25. A method as in claim 23, wherein the skin portion is a PE layer adhered to the flange.

26. A method as in claim 21, further comprising the step of providing an ink layer on the bottom surface of the package film.

27. A method as in claim 21, further comprising the step of securing a bottom layer, the bottom surface secured to the ink layer and the bottom surface of the top layer, and the adhesive pattern applied to a bottom surface of the bottom layer.

28. A method as in claim 21, wherein the step of securing of the bottom layer includes applying a permanent adhesive.

29. A method as in claim 21, wherein the PE emulsion layer is continuously applied over the bottom surface and the adhesive pattern.

30. A method as in claim 21, wherein the removable adhesive is pattern applied over the entire pattern of the removable adhesive.

* * * * *